(12) United States Patent
Tyler et al.

(10) Patent No.: US 7,494,348 B1
(45) Date of Patent: Feb. 24, 2009

(54) CABLE TERMINATION APPARATUS AND METHOD

(75) Inventors: Adam P. Tyler, Rochester Hills, MI (US); Douglas Scott Simpson, Mt. Clemens, MI (US); Aaron J. de Chazal, Rochester, MI (US); Andre E. Guanco, Royal Oak, MI (US); Yezdi N. Soonavala, Rochester Hills, MI (US)

(73) Assignee: Tyco Electronics Corporation, Middletown, PA (US)

( * ) Notice: Subject to any disclaimer, the term of this patent is extended or adjusted under 35 U.S.C. 154(b) by 0 days.

(21) Appl. No.: 11/888,470

(22) Filed: Aug. 1, 2007

(51) Int. Cl.
*H01R 12/00* (2006.01)

(52) U.S. Cl. ........................... 439/79; 439/76.2

(58) Field of Classification Search ............... 439/76.2, 439/79

See application file for complete search history.

(56) References Cited

U.S. PATENT DOCUMENTS

| 5,408,047 | A | * | 4/1995 | Wentzel ............... 174/73.1 |
| 5,895,292 | A | * | 4/1999 | Affeltranger ............ 439/610 |
| 6,048,224 | A | | 4/2000 | Kay |
| 6,639,146 | B1 | | 10/2003 | Chiu |
| 2003/0082937 | A1 | | 5/2003 | Burdick |
| 2004/0115975 | A1 | | 6/2004 | Sato et al. |
| 2006/0205250 | A1 | | 9/2006 | Dickson |

FOREIGN PATENT DOCUMENTS

DE 19936508 3/2001

* cited by examiner

*Primary Examiner*—Truc T Nguyen

(57) ABSTRACT

A cable termination to a power distribution module includes a power distribution module housing having a conductive mounting tube extending therefrom. The mounting tube includes a main bore extending therethrough for receiving a main power cable. A main power cable is received within the main bore, wherein the main power cable includes at least one wire extending into the power distribution module housing. The main power cable includes a cylindrical shield element surrounding the at least one wire. A spring element engages the shield element and biases the shield element into engagement with the mounting tube to electrically common the shield element and the housing.

19 Claims, 5 Drawing Sheets

CABLE TERMINATION APPARATUS AND METHOD

BACKGROUND OF THE INVENTION

This invention relates generally to methods and apparatus for cable termination, and more particularly, to methods and apparatus for cable termination to power distribution modules.

Due to the ever-increasing electrical content present within automotive vehicles, the power distribution system within vehicles has become more complex. Accordingly, power distribution boxes have been commonly employed within many vehicles. The power distribution boxes are typically connected to the vehicle's battery by a main power cable. Tap cables are also connected to the power distribution boxes and run to the various electrical components within the vehicle that require powering.

The cables are typically fitted with a ferrule at the end of the cable, which can be an expensive manufacturing process. The cables are then connected to the power distribution box by mating the ferrule with a mating part of the power distribution box. The ferrule is then secured to the power distribution box using either clamps or fasteners. However, securing the ferrule to the power distribution box can be a time consuming process. Additionally, conventional power distribution systems are adapted for use with low voltage distribution systems, which distribute power from a conventional 12 volt battery. Such systems are not equipped to operate with high voltage systems that are employed in some vehicles, such as electrical vehicles.

As such, a need remains for a power distribution system that may be assembled in a cost effective and reliable manner. Additionally, a need remains for a power distribution system that is capable of distributing high voltage power through the system.

BRIEF DESCRIPTION OF THE INVENTION

In one embodiment, a cable termination to a power distribution module is provided that includes a power distribution module housing having a conductive mounting tube extending therefrom. The mounting tube includes a main bore extending therethrough for receiving a main power cable. A main power cable is received within the main bore, wherein the main power cable includes at least one wire extending into the power distribution module housing. The main power cable includes a cylindrical shield element surrounding the at least one wire. A spring element engages the shield element and biases the shield element into engagement with the mounting tube to electrically common the shield element and the housing.

Optionally, the mounting tube may extend from an end wall of the housing, wherein the shield element is positioned along an inner surface of the mounting tube and is forced into engagement with the inner surface by the spring element. The shield element may be wrapped around an exterior surface of the mounting tube and forced into engagement with the outer surface by the spring element. Optionally, the shield element may provide approximately 360 degree shielding of the at least one wire at the interface of the shield element and the housing.

In another embodiment, a cable termination to a power distribution module is provided, wherein the power distribution module has a housing that includes a mounting tube extending therefrom, and the mounting tube includes a main bore extending therethrough. The cable termination includes a main power cable that includes at least one wire, a shield element surrounding the at least one wire, and an insulative jacket surrounding the shield element. The main power cable is received within the main bore of the mounting tube such that the shield element is electrically connected to the mounting tube. A sleeve surrounds at least a portion of the main power cable and is configured to surround at least a portion of the mounting tube to secure the main power cable to the housing of the power distribution module. The sleeve is also configured to seal the main bore from the external environment of the housing.

Optionally, the sleeve may include a polymer material configured to shrink tightly around the main power cable and the mounting tube when heated. An inner surface of the sleeve may include an adhesive layer for adhering to at least one of the main power cable and the mounting tube.

In a further embodiment, a cable termination to a power distribution module is provided that includes a power distribution module housing having a mounting tube extending therefrom. The mounting tube includes a bore extending therethrough. A power cable extends through the mounting tube and includes at least one wire and a cylindrical shield element surrounding the at least one wire. A spring element engages the shield element and biases the shield element into engagement with the mounting tube to electrically common the shield element and the housing. A sleeve surrounds the power cable and the mounting tube. The sleeve is configured to secure the power cable to the housing and the sleeve is configured to seal the bore from the external environment of the housing.

DETAILED DESCRIPTION OF THE INVENTION

Figure 1:
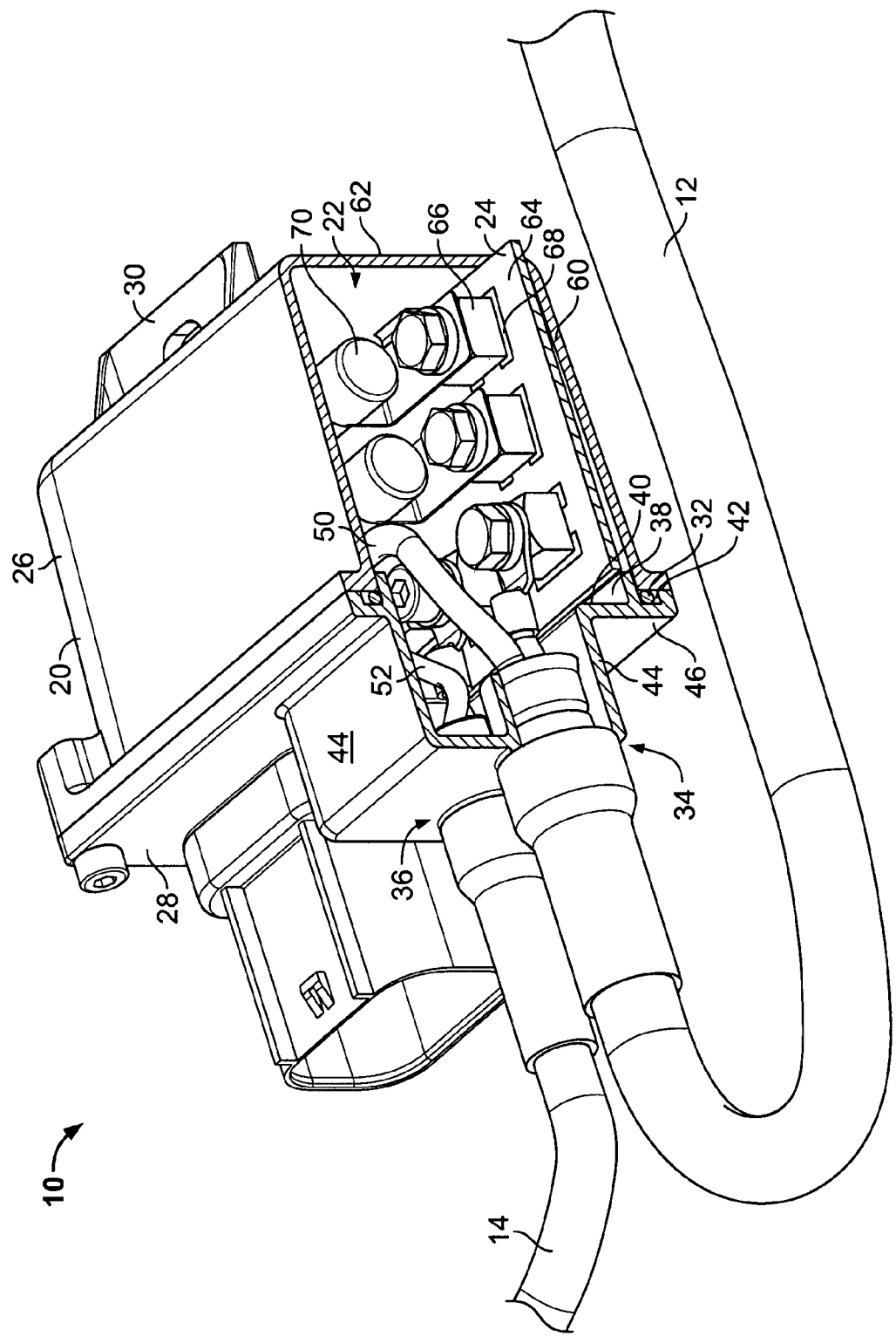
FIG. 1 is a partial cutaway view of a cable termination to a power distribution module in accordance with an exemplary embodiment.

FIG. 1 is a partial cutaway view of a cable termination to a power distribution module 10. The power distribution module 10 is used within a power distribution system and distributes power from a main power cable 12 to a tap power cable 14. Optionally, more than one tap power cable may be provided. In an exemplary embodiment, the power distribution module 10 represents a power distribution box, however, the power distribution module may be another type of module for distributing power, such as, but not limited to, a power junction box, a relay module, and the like.

In an exemplary embodiment, the power distribution module 10 is adapted for an automotive application and is mounted, for example, in an engine compartment of the vehicle. As such, the power distribution module 10 is subjected to a harsh environment of extreme temperatures and vibrations. The power distribution module 10 is thus designed to be rugged and sturdy. The power distribution module 10 may also be subjected to a moist or wet environment, and is thus designed to be sealed.

The power distribution module 10 includes a housing 20 defining a component chamber 22 that receives at least one electrical component 24 therein. In an exemplary embodiment, the housing 20 includes a housing body 26 that defines the component chamber 22 and a housing faceplate 28 that covers the component chamber 22. The housing body 26 may be substantially box-shaped and may include tabs 30 for mounting to a frame or other support structure. However, the shape of the housing body 26 may depend on the size and shape of the electrical component 24 received therein and/or the size of the location in which the housing 20 is mounted. Additionally, other types of fastening elements may be used to secure the housing 20 to the support structure. In an exemplary embodiment, the housing body 26 and the faceplate 28 are fabricated from a conductive material, such as a metal material.

The faceplate 28 is securely coupled to the housing body 26, such as by using fasteners. Optionally, and as illustrated in FIG. 1, a seal 32 is provided between the faceplate 28 and the housing body 26. The seal 32 may be a rubber gasket, or another type of seal such as sealant applied to one of the faceplate 28 or the housing body 26. The faceplate 28 includes a cable mounting portion 34, to which the main power cable 12 is mounted. Optionally, the faceplate 28 may also include a tap cable mounting portion 36, to which the tap power cable is mounted. More than one tap cable mounting portions 36 may be provided in alternative embodiments. Additionally, other types of devices or assemblies used within the power distribution system may be mounted to the faceplate 28, such as a header assembly (not shown). In an alternative embodiment, the cable mounting portion 34 and/or the tap cable mounting portion 36 may be provided on the housing body 26 rather than the faceplate 28.

In the illustrated embodiment, the faceplate 28 is generally planar and includes a lip 38 extending from a first side 40 of the faceplate 28. The lip 38 rests within the component chamber 22 and positions the faceplate 28 with respect to the housing body 26. The faceplate 28 includes a groove 42 surrounding the lip 38 and positioned radially outward from the lip 38. The seal 32 is received within the groove 42. The faceplate 28 includes a standoff portion 44 extending from a second side 46 of the faceplate 28. The standoff portion 44 includes the cable mounting portions 34, 36. The standoff portion 44 provides a space for the power cables 12, 14 to transition for connection with the electrical component 24, as described in further detail below.

The main power cable 12 is coupled to the faceplate 28 at the cable mounting portion 34. In an exemplary embodiment, the main power cable 12 represents a shielded cable having a pair of individual wires 50 (shown in FIG. 2) that extend through the faceplate 28 and that are terminated to the electrical component 24. Optionally, the main power cable 12 may be configured as a high voltage cable supplying high voltage power to the power distribution module 10. High voltage may be considered as any voltage high enough to cause dangerous, life-threatening, amounts of current through a human being. For example, high voltage may be over approximately 50 volts. In one embodiment, the main power cable 12 is configured to supply approximately 300 volts. In the automotive context, high voltage is compared to low voltage, which is approximately 12 volts, which is the amount of volts of a typical vehicle battery. When dealing with high voltage applications, particular attention may be directed to shielding the power cable. Additionally, attention may be directed to sealing the component chamber 22 and the wires 50. The main power cable 12 is coupled at an opposite end to a power source, such as a battery. One of the wires 50 carries a positive charge from the power source to the electrical component 24 and the other wire 50 carries a negative charge from the power source to the electrical component 24. Other types of cables/conductors/wires may be used as part of the power distribution system.

The tap power cable 14 is coupled to the faceplate 28 at the tap cable mounting portion 36 in a similar fashion as the main power cable 12. In an exemplary embodiment, the tap power cable 14 represents a shielded cable having a pair of individual wires 52 that extend through the faceplate 28 and are terminated to the electrical component 24. The tap power cable 14 is coupled at an opposite end to a distribution element or component to which the power distribution system distributes power. For example, in the embodiment of an automotive vehicle, the distribution element may be a motor, an ignition, a starter, a radio, or another element needing power to operate, or the distribution element may be another power distribution module. When the power distribution module 10 is used in non-automotive applications, the distribution element may be a different type of element that requires power to operate. One of the wires 52 carries a positive charge from the electrical component 24 to the distribution element and the other wire 52 carries a negative charge from the electrical component 24 to the distribution element. Other types of cables/conductors/wires may be used as part of the power distribution system. In an alternative embodiment, the tap power cable 14 may be a different type of cable than the main power cable 12.

Additional types of devices may be coupled to the power distribution module 10 and tap into the power supplied to the power distribution module 10 by the main power cable 12. For example, a header connector (not shown) may be plugged into a header assembly portion of the power distribution module 10 to distribute power therefrom.

The electrical component 24 is received within the component chamber 22 and is positioned to electrically connect to the main and tap power cables 12, 14. Optionally, the electrical component 24 may be secured to a side wall 60 and/or an end wall 62 of the housing body 26. In an exemplary embodiment, the electrical component represents a printed circuit board. The electrical component 24 includes at least one interface 64 for mating with the power cables 12, 14. In an exemplary embodiment, bushings 66 are secured to the interface 64 and are electrically connected to pads 68 on the electrical component 24. The wires 50, 52 are connected to the bushings 66, such as by a ring tongue terminal, another type of terminal, or a direct connection. Optionally, fuses 70 may be provided and electrically connected to the bushings 66 and/or the pads 68. Predetermined ones of the pads 68 are interconnected by traces such that the power may be distributed through the power distribution module 10 from the main power cable 12 to the tap power cable 14. Alternatively, rather than the pads and traces, the power distribution module 10 may distribute the power between the main power cable 12 to the tap power cable 14 by wired connections, buss bars, and the like.

Figure 2:
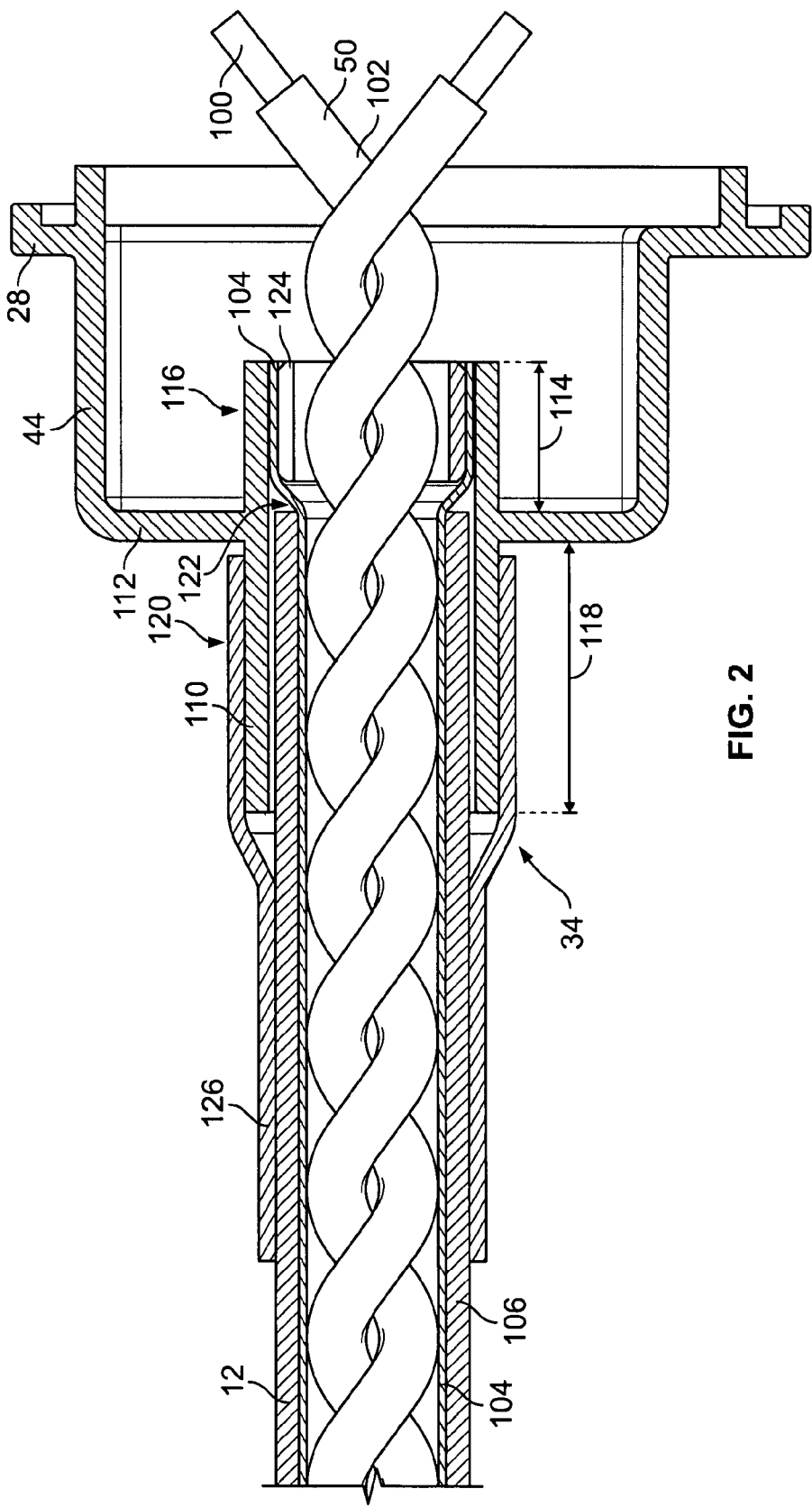
FIG. 2 illustrates a main power cable terminated to the power distribution module shown in FIG. 1.

FIG. 2 is a cross-sectional view of a portion of the power distribution module 10 (shown in FIG. 1) and the main power cable 12. FIG. 2 illustrates the housing faceplate 28 and the main power cable 12 securely coupled to the faceplate 28.

As described above, in an exemplary embodiment, the main power cable 12 includes a pair of wires 50. The wires 50 each include a center conductor 100 and an insulating sheath 102 surrounding the conductor 100. The wires 50 are wrapped around one another in a twisted arrangement. A cylindrical shield element 104, such as a metallic braided sheath or a solid metallic sheath, surrounds the wires 50. The shield element 104 provides circumferential shielding of the wires 50. A cylindrical jacket 106 surrounds the shield element 104 and defines an outer surface of the power cable 12. The jacket 106 is fabricated from a non-conductive material, such as a plastic material, and provides an insulating layer.

The faceplate 28 includes a mounting tube 110 provided at the cable mounting portion 34. The mounting tube 110 extends inwardly and outwardly from a support wall 112 defining the standoff portion 44. The mounting tube 110 extends inwardly for a distance 114, which defines an inner tube portion 116. The mounting tube extends outwardly from the support wall 112 for a distance 118, which defines an outer tube portion 120. The mounting tube 110 is hollow and includes a main bore 122 extending therethrough. The main bore 122 is sized to receive the main power cable 12 therein. Optionally, a seal or a sealant may be provided between the main power cable 12 and the main bore 122 for sealing the component chamber 22 (shown in FIG. 1) from the external environment of the power distribution module 10.

In an exemplary embodiment, the shield element 104 of the main power cable 12 is electrically connected to the inner tube portion 116. As described below in further detail, a spring element 124 is used to force the shield element 104 into physical contact with the inner tube portion 116. As such, the shield element 104 is electrically commoned with the housing 20 (shown in FIG. 1).

In an exemplary embodiment, a sleeve 126 is provided that surrounds the main power cable 12 and the outer tube portion 120 of the mounting tube 110. The sleeve 126 is configured to secure the main power cable 12 to the faceplate 28. Optionally, the sleeve 126 may also be configured to seal the main bore 122 from the external environment. In an exemplary embodiment, the sleeve 126 is fabricated from a polymer material that shrinks tightly around the main power cable 12 and the mounting tube 110 when heated. For example, the sleeve 126 may be a cylindrical shrink tube that is slipped over the end of the main power cable 12 during assembly. Alternatively, the sleeve 126 may be a film that is wrapped around the main power cable 12 and the mounting tube 110 after the main power cable 12 is loaded therein. The sleeve 126 extends along the main power cable 12 for an amount that is sufficient to securely hold the main power cable 12 in place. The sleeve 126 extends along the outer tube portion 120 for an amount that is sufficient to securely couple the main power cable 12 to the faceplate 28. As such, the sleeve 126 mechanically secures the main power cable 12 to the faceplate 28. Optionally, an adhesive may be applied to at least one of the sleeve 126, the main power cable 12 and/or the mounting tube 110 to provide additional mechanical stability to the connection therebetween. Optionally, other fastening means may be provided to secure the main power cable 12 to the faceplate 28, such as clamps, retention barbs, fasteners and the like.

Figure 3:
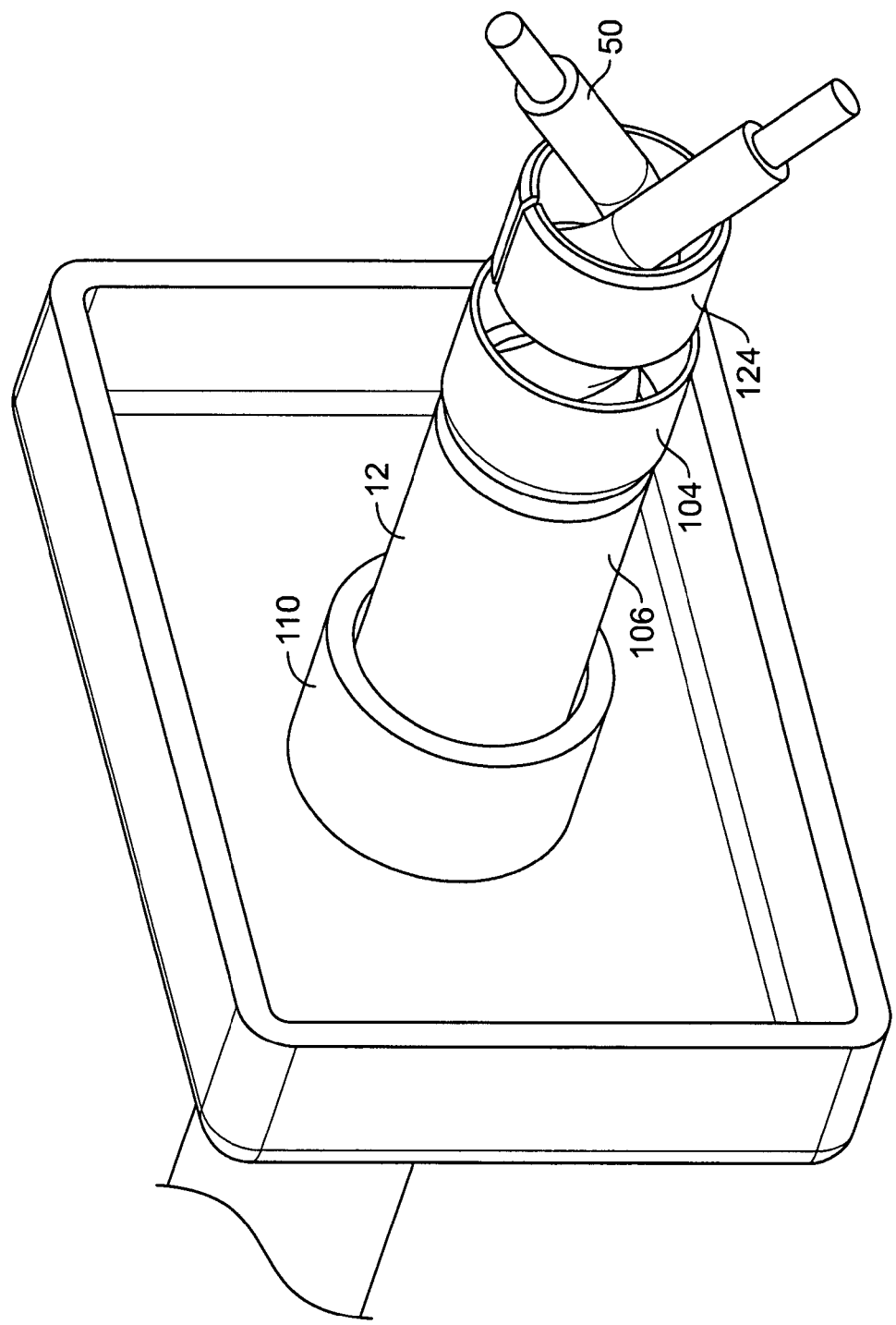
FIG. 3 shows a perspective view of the power distribution module and the main power cable shown in FIG. 2 during an assembly step.
Figure 4:
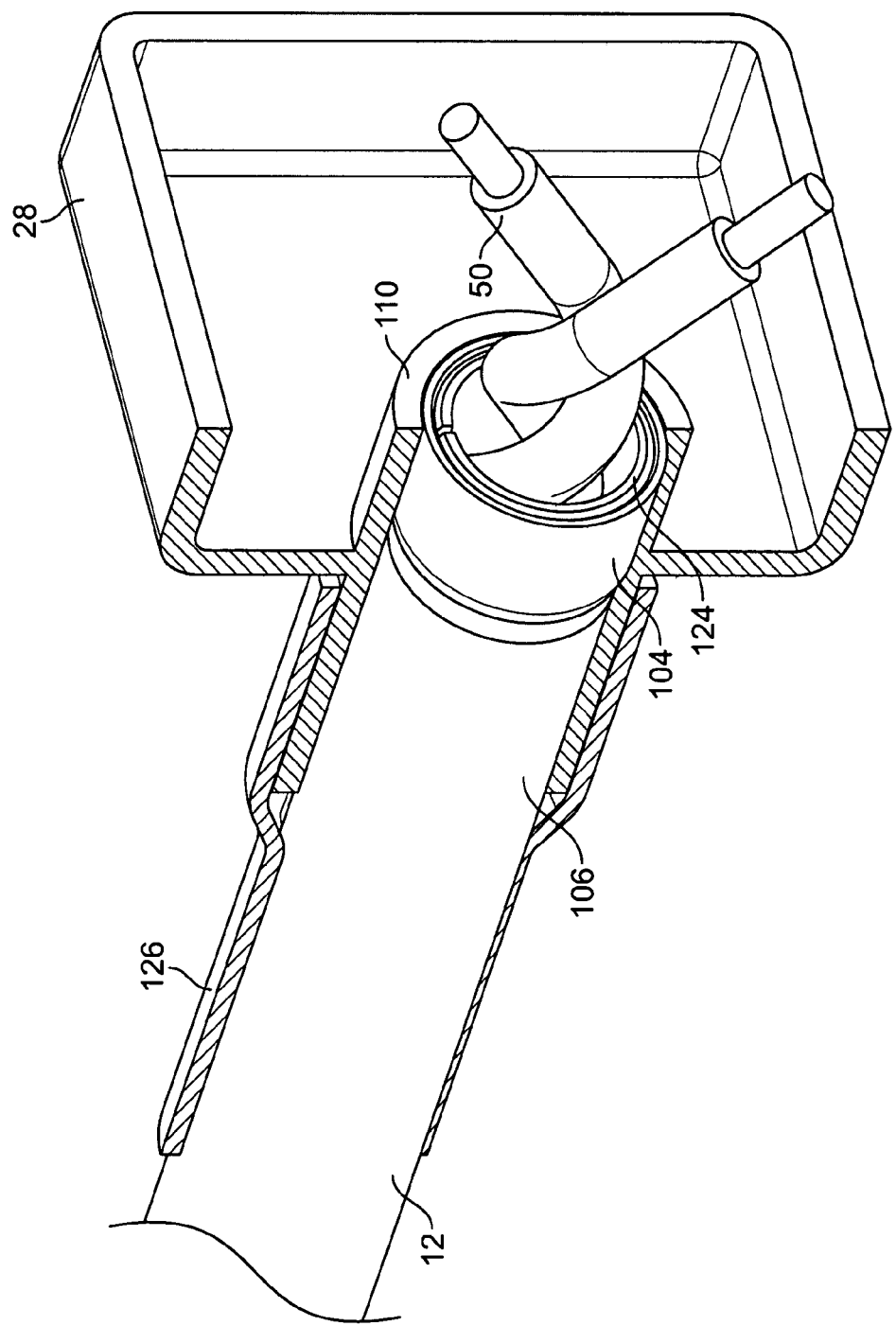
FIG. 4 shows a perspective view of the power distribution module and the main power cable shown in FIG. 3 during a different assembly step.

FIGS. 3 and 4 show perspective views of a portion of the power distribution module 10 (shown in FIG. 1) and the main power cable 12 during assembly thereof. During assembly, the main power cable 12 is loaded through the mounting tube 110. The jacket 106 and shield element 104 of the main power cable 12 are removed to expose a length of the wires 50 and then a portion of the jacket 106 is stripped to expose the shield element 104. The removal and/or stripping may be performed prior to, or post, loading through the mounting tube 110. The spring element 124 is then aligned with the main power cable 12 and loaded onto the wires 50. The spring element 124 is placed within the shield element 104 and generally forces or expands the exposed portion of the shield element outward.

As illustrated in FIG. 4, the main power cable 12 is then pulled in the reverse direction through the faceplate 28 so that the exposed portion of the shield element 104, with the incorporated spring element 124, is located within the mounting tube 110 inner tube portion 116. The spring element 124 provides a radially outward force on the shield element 104 such that the spring element 124 forces the shield element 104 into engagement with the inner surface of the mounting tube 110. An mechanical and/or electrical connection is thus made between the shield element 104 and the faceplate 28.

The main power cable 12 is secured to the mounting tube 110 by the sleeve 126, which may function as a strain relief. The sleeve 126 extends along at least a portion of the mounting tube 110 and at least a portion of the main power cable 12. When heat is applied to the sleeve 126, the sleeve 126 shrinks tightly around the main power cable 12 and the mounting tube 110. The sleeve 126 resists axial and rotational movement of the main power cable 12 with respect to the mounting tube 110. When the sleeve 126 is applied to the main power cable 12 and the mounting tube 110, the sleeve 126 seals the main bore 122 from the external environment surrounding the sleeve 126 and the faceplate 28.

Figure 5:
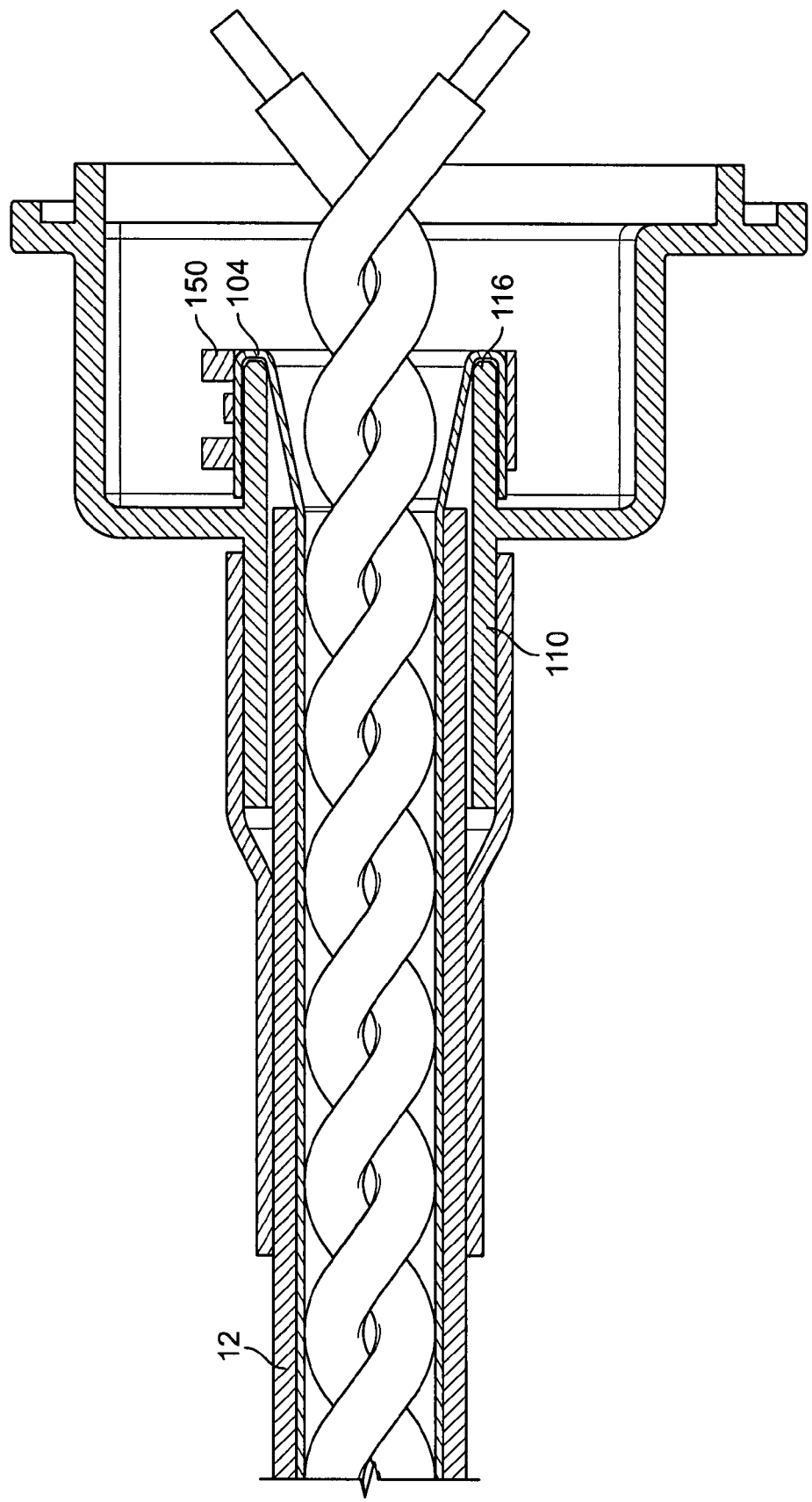
FIG. 5 shows an alternative assembled configuration for the power distribution module and the main power cable.

FIG. 5 shows an alternative assembled configuration for the power distribution module 10 (shown in FIG. 1) and the main power cable 12. In the embodiment illustrated in FIG. 5, the exposed portion of the shield element 104 is folded back over the end of the inner tube portion 116 of the mounting tube 110. The shield element 104 is exposed along the external surface of the mounting tube 110. A biasing mechanism such as a spring element or spring clamp 150 is placed around the shield element 104 and maintains a mechanical and electrical connection between the shield element 104 and the faceplate 28. Other types of biasing mechanisms may be used in alternative embodiments to hold the shield element 104 against the mounting tube 110.

Referring to the above described embodiments, a power distribution module 10 is thus provided that may be assembled in a cost effective and reliable manner. The main power cable 12 may be quickly terminated to the housing 20 and/or the electrical component 24. The shield element 104 of the main power terminal 12 maintains good electrical contact with the faceplate 28 by using the spring element 124. The sleeve 126 easily and reliably secures the main power cable 12 to the faceplate 28. The sleeve 126 seals the connection between the main power cable 12 and the faceplate.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. Dimensions, types of materials, orientations of the various components, and the number and positions of the various components described herein are intended to define parameters of certain embodiments, and are by no means limiting and are merely exemplary embodiments. Many other embodiments and modifications within the spirit and scope of the claims will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means—plus-function format and are not intended to be interpreted based on 35 U.S.C. § 112, sixth paragraph, unless and until such claim limitations expressly use the phrase "means for" followed by a statement of function void of further structure.

What is claimed is:

1. A cable termination to a power distribution module comprising:

a power distribution module housing having a conductive mounting tube extending therefrom, the mounting tube includes a main bore extending therethrough for receiving a main power cable;

a main power cable received within the main bore, wherein the main power cable includes at least one wire extending into the power distribution module housing, and wherein the main power cable includes a cylindrical shield element surrounding the at least one wire;

a commoning element engaging the shield element and securing the shield element into engagement with the mounting tube to electrically common the shield element and the housing; and a tap power cable secured to the housing, wherein the tap power cable includes at least one wire received within the power distribution module housing and electrically connected to the main power cable wire, wherein power is distributed from the main power cable to the tap power cable.

2. The cable termination of claim 1, wherein the mounting tube extends from an end wall of the housing, the shield element being positioned along an inner surface of the mounting tube and forced into engagement with the inner surface by the spring element.

3. The cable termination of claim 1 wherein the mounting tube extends from an end wall of the housing, the shield element being wrapped around an exterior surface of the mounting tube and forced into engagement with the outer surface by the spring element.

4. The cable termination of claim 1, wherein the shield element provides approximately 360 degree shielding of the at least one wire at the interface of the shield element and the housing.

5. The cable termination of claim 1, further comprising a tubular sleeve surrounding the main power cable and the mounting tube, the sleeve configured to secure the main power cable to the housing and the sleeve configured to seal the main bore from the external environment of the housing.

6. The cable termination of claim 1, further comprising a sleeve surrounding the main power cable and the mounting tube, the sleeve comprises a polymer material configured to shrink tightly around the main power cable and the mounting tube when heated.

7. The cable termination of claim 1, further comprising an electrical component received within the power distribution module housing, the electrical component includes a printed circuit board, wherein the at least one wire is electrically connected to the printed circuit board and power supplied by the at least one wire is distributed by the printed circuit board to a tap wire electrically connected to another part of the printed circuit board.

8. A cable termination to a power distribution module having a housing that includes a mounting tube extending therefrom, the mounting tube includes a main bore extending therethrough, wherein the cable termination comprises:

a main power cable that includes at least one wire, a shield element surrounding the at least one wire, and an insulative jacket surrounding the shield element, the main power cable is received within the main bore of the mounting tube such that the shield element is electrically connected to the mounting tube; and a sleeve surrounding at least a portion of the main power cable and configured to surround at least a portion of the mounting tube to secure the main power cable to the housing of the power distribution module, wherein the sleeve is configured to seal the main bore from the external environment of the housing.

9. The cable termination of claim 8, wherein the sleeve comprises a polymer material configured to shrink tightly around the main power cable and the mounting tube when heated.

10. The cable termination of claim 8, wherein an adhesive is provided between the sleeve and at leas tone of the insulative jacket and the mounting tube.

11. The cable termination of claim 8, further comprising a spring element engaging the shield element and biasing the shield element into engagement with the mounting tube.

12. The cable termination of claim 8, further comprising a spring element engaging an inner surface of the shield element such that the shield element is positioned between the spring element and the mounting tube, the spring element biasing the shield element into engagement with the mounting tube.

13. The cable termination of claim 8, wherein the power distribution module has a printed circuit board received within the housing, wherein the at least one wire is configured to be electrically connected to the printed circuit board and power supplied by the at least one wire is configured to be distributed by the printed circuit board to a tap wire electrically connected to another part of the printed circuit board.

14. The cable termination of claim 8, wherein the main power cable comprises a high voltage cable being grounded to the housing.

15. A cable termination to a power distribution module comprising:

a power distribution module housing having a mounting tube extending therefrom, the mounting tube includes a bore extending therethrough;

a power cable extending through the mounting tube, wherein the power cable includes at least one wire and a cylindrical shield element surrounding the at least one wire;

a spring element engaging the shield element and biasing the shield element into engagement with the mounting tube to electrically common the shield element and the housing; and a sleeve surrounding the power cable and the mounting tube, the sleeve configured to secure the power cable to the housing and the sleeve configured to seal the bore from the external environment of the housing.

16. The cable termination of claim 15, wherein the mounting tube extends from an end wall of the housing, the shield element being positioned along an inner surface of the mounting tube and forced into engagement with the inner surface by the spring element.

17. The cable termination of claim 15, wherein the mounting tube extends from an end wall of the housing, the shield element being wrapped around an exterior surface of the mounting tube and forced into engagement with the outer surface by the spring element.

18. The cable termination of claim 15, wherein the sleeve comprises a polymer material configured to shrink tightly around the power cable and the mounting tube when heated.

19. The cable termination of claim 15, wherein the housing is configured to be mounted within an automotive environment, and wherein the bore is sealed from the automotive environment by the sleeve.

* * * * *